United States Patent [19]

Hayashi

[11] Patent Number: 5,115,303

[45] Date of Patent: May 19, 1992

[54] IMAGE PICK-UP APPARATUS

[75] Inventor: Muneo Hayashi, Kanagawa, Japan

[73] Assignee: Sony Corporation, Tokyo, Japan

[21] Appl. No.: 618,411

[22] Filed: Nov. 27, 1990

[30] Foreign Application Priority Data

Nov. 27, 1989 [JP] Japan ............................... 1-306858

[51] Int. Cl.$^5$ .................................... H04N 9/093
[52] U.S. Cl. .................................................. 358/51
[58] Field of Search ................ 358/51, 44, 43, 41, 358/35, 29, 21 R

[56] References Cited

U.S. PATENT DOCUMENTS 4,246,677  2/1987  Takanashi ........................ 358/41
4,974,058  11/1990 Takayama ...................... 358/21 R

FOREIGN PATENT DOCUMENTS 91275   7/1980 Japan ................................. 358/51
94496   1/1983 Japan ................................. 358/51
146589  8/1985 Japan ................................. 358/51

Primary Examiner—Tommy P. Chin
Attorney, Agent, or Firm—Hill, Van Santen, Steadman & Simpson

[57] ABSTRACT

An image pick-up apparatus adapted to respectively transmit image pick-up outputs of three primary color from the image pick-up unit through different paths to implement signal processing thereto, wherein image pick-up outputs of three primary colors transmitted to the signal processing unit are introduced to sample-and-hold circuits and delay circuits to control sampling timings of the sample-and-hold circuits and delay times of the delay circuits on the basis of phase differences between respective outputs to thereby correct, at the signal processing unit, phase differences produced between respective image pick-up outputs resulting from differences between lengths of the transmission paths.

2 Claims, 7 Drawing Sheets

IMAGE PICK-UP APPARATUS

BACKGROUND OF THE INVENTION

1. Field of the Invention

This invention relates to an image pick-up apparatus, e.g., a color television camera apparatus of a structure such that an image pick-up unit for picking up an image of an object and a signal processing unit for implementing a signal processing to image pick-up outputs of three primary colors from the image pick-up unit can be separate through a transmission unit, and more particularly to an image pick-up apparatus adapted to correct phase differences produced between respective image pick-up outputs when transmitted from the image pick-up unit to the signal processing unit.

2. Description of the Related Art

Generally, in image pick-up apparatuses such as color television camera apparatuses for business use for which high picture quality and high resolution are required, an image pick-up light of an object is color-separated into rays of light in the wavelength region of three primary colors of red (R), green (G) and blue (B) by means of a prism, etc. to pick up images of these rays of image pick-up light of three primary colors by using different image pick-up tubes or image pick-up devices, respectively, thus to form image pick-up outputs of three primary colors. Then, these image pick-up outputs of three primary colors are synthesized by the signal processing to form an output video signal.

In image pick-up apparatuses adapted to color-separate an image pick-up light into three primary colors to respectively pick-up their images in a manner stated above, it is required, in forming an output video signal, to allow phases of respective image pick-up outputs to be in correspondence with each other so that respective pictorial images of three primary colors precisely overlap with each other.

For this reason, in image pick-up apparatuses using e.g., image pick-up tubes, an approach is employed to adjust registration in regard to centering of R, G and B images, etc. by varying the deflection characteristics of respective image pick-up tubes, or the like to thereby correct phase differences between image pick-up outputs of three primary colors at the time of start of photographing.

Further, in image pick-up apparatuses using solid state image pick-up devices such as CCD (Charge Coupled Devices), etc., since phases of respective image pick-up outputs are determined in dependency upon positions of respective image pick-up devices, if an approach is employed at the time of manufacturing to adjust the above-mentioned centering to fix the respective image pick-up devices, an adjustments by user could become unnecessary. In addition, for example, as proposed in the Japanese Patent Application Laid Open No. 146589/85, there is known a technique to electrically correct phase differences between image pick-up outputs from the solid state image pick-up devices.

Meanwhile, in recent years, in image pick-up apparatuses of this kind, there have been developed apparatuses of a structure such that the image pick-up unit for picking up an image of an object and the signal processing unit for implementing a signal processing to image pick-up signals are separate and independent to transmit image pick-up outputs of three primary colors formed in the image pick-up unit to the signal processing unit through transmission paths such as coaxial cables or optical fiber cables, etc, respectively. For example, image pick-up apparatuses of such a structure are used for apparatuses in which the image pick-up unit is extremely miniaturized so that a special photographing can be carried out, apparatuses for high definition television such as high vision, etc. and provided with a very large signal processing unit.

However, when an attempt is made to transmit image pick-up outputs of three primary colors formed at the image pick-up unit in a manner stated above through transmission paths different from each other, respectively, there may occur differences between delay times in transmitting respective video outputs resulting from the difference between characteristics such as wavelength shortening rate or refractive index, etc. of respective cores constituting these transmission paths, or differences between length of respective cores in cabling, etc.

For this reason, even if phases of respective image pick-up outputs transmitted through transmission paths different from each other are in correspondence with each other between respective image pick-up outputs when outputted from the image pick-up unit, any phase difference or shift may occur at the signal processing unit. In addition, quantities of phase differences may vary by changing the transmission paths.

Accordingly, in the apparatuses of a structure to respectively transmit image pick-up outputs of three primary colors through transmission paths of the above-mentioned apparatuses using solid state image pick-up devices, it is required to correct phase differences produced between image pick-up outputs resulting from differences between lengths of transmission paths.

Particularly, in apparatuses for high definition television, since resolution or picture quality is extremely degraded when any color shift occurs, it is required to rigorously correct such phase difference.

OBJECT AND SUMMARY OF THE INVENTION

This invention has been proposed in order to solve such technical problems, and its object is to provide an image pick-up apparatus adapted to correct, at the signal processing unit, phase differences produced between respective image pick-up outputs resulting from the differences between lengths of transmission paths or the like, thereby permitting phases of image pick-up outputs of three primary colors to be precisely in correspondence with each other to form an output video signal which does not cause a color shift in the pictorial image.

To achieve the above-described object, an image pick-up apparatus including an image pick-up unit for picking up an image of an object to form image pick-up outputs of three primary colors, a transmission unit for transmitting image pick-up outputs of three primary colors through different transmission paths, respectively, and a signal processing unit for implement signal processing to image pick-up outputs of three primary colors transmitted from the image pick-up unit through the transmission unit to form an output video signal, characterized in that the signal processing circuit comprises: a clock generator for generating a clock signal having a predetermined frequency; first, second and third sample-and-hold circuits for sampling and folding image pick-up outputs of three primary colors transmitted through the transmission paths of the transmission unit at a sampling period equal to a period of the clock signal, respectively; fourth, five and sixth sample-and-hold circuits for sampling and holding outputs from the first to third sample-and-hold circuits at the period of the clock signal delivered from the clock generator, respectively; three delay circuits for delaying outputs from the first to third sample-and-hold circuits, respectively; a phase difference detector for detecting phase differences between the image pick-up outputs of three primary colors to which the processing by the fourth to sixth sample-and-hold circuits and the processing by the three delay circuits have been implemented, and a control circuit for respectively controlling sampling timings of the first to third sample-and-hold circuits on the basis of phase differences detected at the phase difference detector to correct phase differences of which period is shorter than the sampling period, and to respectively control delay times of the above-mentioned three delay circuits to correct phase differences which multiple of an integer of the sampling period.

In accordance with the image pick-up apparatus according to this invention, phase differences between image pick-up outputs of three primary colors transmitted by the transmission unit are detected at the phase difference detector. The control circuit control sampling timings of the first to third sample-and-hold circuits on the basis of phase differences detected at the phase difference detector to correct phase differences less than the sampling period of the fourth to sixth sample-and-hold circuits. Further, the control circuit controls delay times of the three delay circuits on the basis of phase differences detected at the phase difference detector to correct phase differences which are multiple of an integer of the sampling period.

BRIEF DESCRIPTION OF THE INVENTION

FIG. 1 is a block diagram showing an image pick-up apparatus of an embodiment according to this invention, FIG. 2 is a block diagram showing a phase difference detector used in this image pick-up apparatus, FIG. 3 is a time chart for explaining the operation of the above-mentioned phase difference detector when a red image pick-up output has a lagging phase, FIG. 4 is a time chart for explaining the operation of the above-mentioned phase difference detector when the red image pick-up output has a leading phase, FIG. 5 is a flowchart showing the procedure of the control operation by the control circuit used in the above-mentioned image pick-up apparatus, FIG. 6 is a time chart for explaining the above-mentioned control operation in the case where phase differences between image pick-up outputs are less than a sampling period, FIG. 7 is a time chart for explaining the above-mentioned control operation in the case where phase differences between image pick-up outputs are greater than the sampling period, FIG. 8 is a circuit diagram showing an actual example of the control circuit used in the above-mentioned image pick-up apparatus, and FIG. 9 is a circuit diagram showing an actual example of the shift register used in the above-mentioned image pick-up apparatus.

DETAILED DESCRIPTION OF THE PREFERRED EMBODIMENT

A preferred embodiment of this invention will now be described with reference to the attached drawings.

Figure 1:
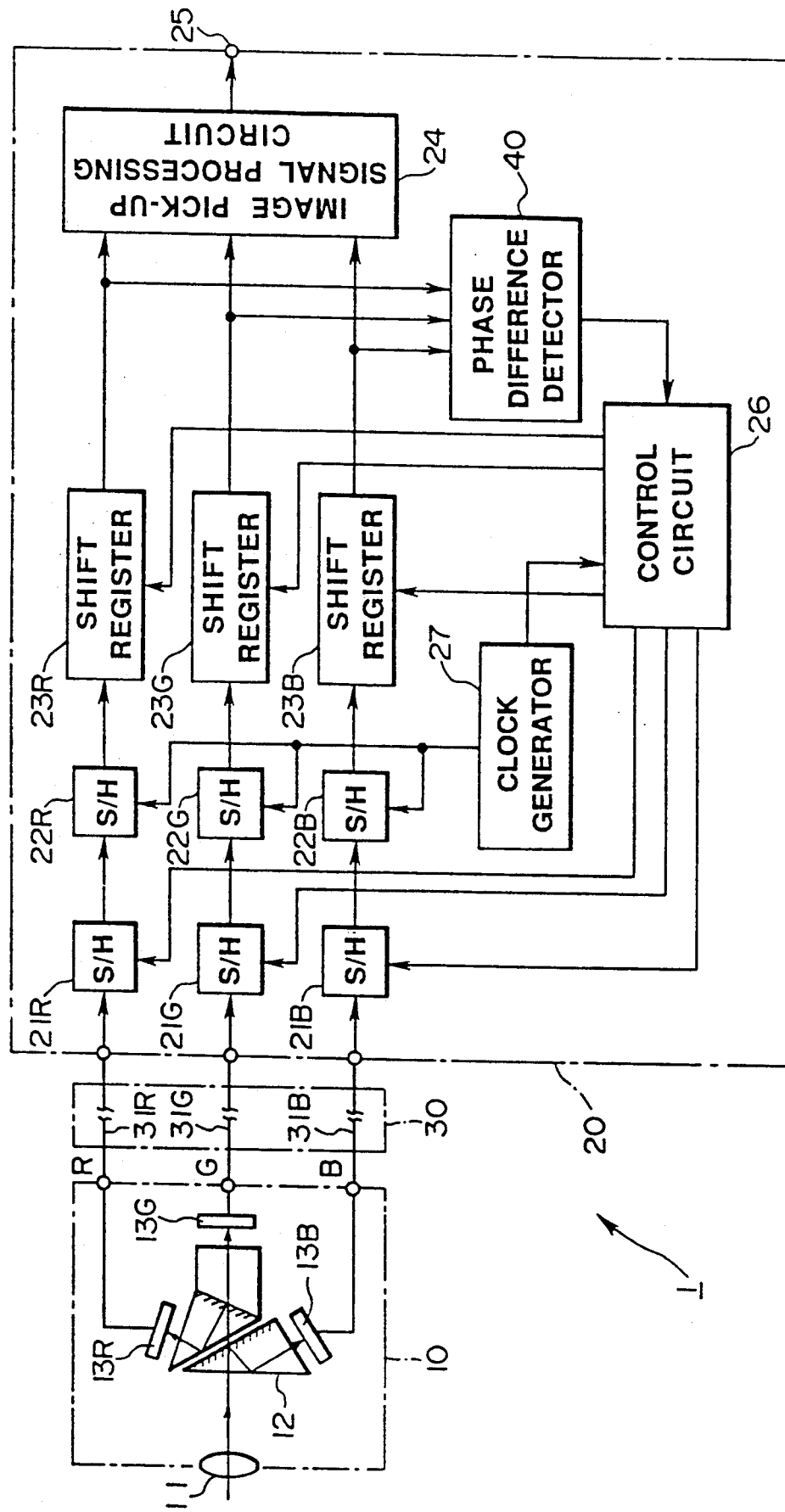

FIG. 1 is a block diagram showing an image pick-up apparatus 1 of this embodiment. The image pick-up apparatus 1 is of a separate structure such that an image pick-up unit 10 for picking up an image of an object and a signal processing unit 20 for implementing signal processing to an image pick-up output from the image pick-up unit 10 are separate with each other. The image pick-up unit 10 and the signal processing unit 20 are connected through a transmission unit 30.

The image pick-up unit 10 serves to color-separate an image pick-up light given through a lens 11 into rays of image pick-up light of three primary colors of red (R), green (G) and blue (B) by means of a prism 12 to respectively pick up images of rays of image pick-up light of these three primary colors by means of solid state image pick-up devices 13R, 13G and 13B such as CCDs, etc., thus to form image pick-up outputs. The image pick-up outputs of three primary colors formed at these solid state image pick-up devices 13R, 13G and 13B are delivered to the transmission unit 30 through an output circuit (not shown).

This transmission unit 30 is formed by a bundle of transmission paths 31R, 31G and 31B such as coaxial cables, etc. By way of these transmission paths 31R, 31G and 31B, image pick-up outputs of three primary colors from the image pick-up unit 10 are delivered to the signal processing unit 20, respectively. As previously described, there may occur phase differences between respective image pick-up outputs thus transmitted due to differences between lengths or characteristics of these transmission paths 31R, 31G and 31B.

The image pick-up outputs of three primary colors transmitted from the image pick-up unit 10 through the transmission unit 30 are delivered from an input circuit (not shown) to an image pick-up signal processing circuit 24, at the signal processing unit 20, through first to third sample-and-hold circuits 21R, 21G and 21B, fourth to sixth sample-and-hold circuits 22R, 22G and 22B, and three shift registers 23R, 23G and 23B serving as delay circuits in order recited. By implementing signal processing to these image pick-up outputs at the image pick-up signal processing circuit 24, they are transformed to an output video signal, e.g., a composite video signal. The output video signal thus obtained is transmitted from an output terminal 25 to the external device such as a video tape recorder, etc.

Further, the image pick-up outputs of three primary colors outputted from the respective shift registers 23R, 23G and 23B are also delivered to a phase difference detector 40.

Figure 2:
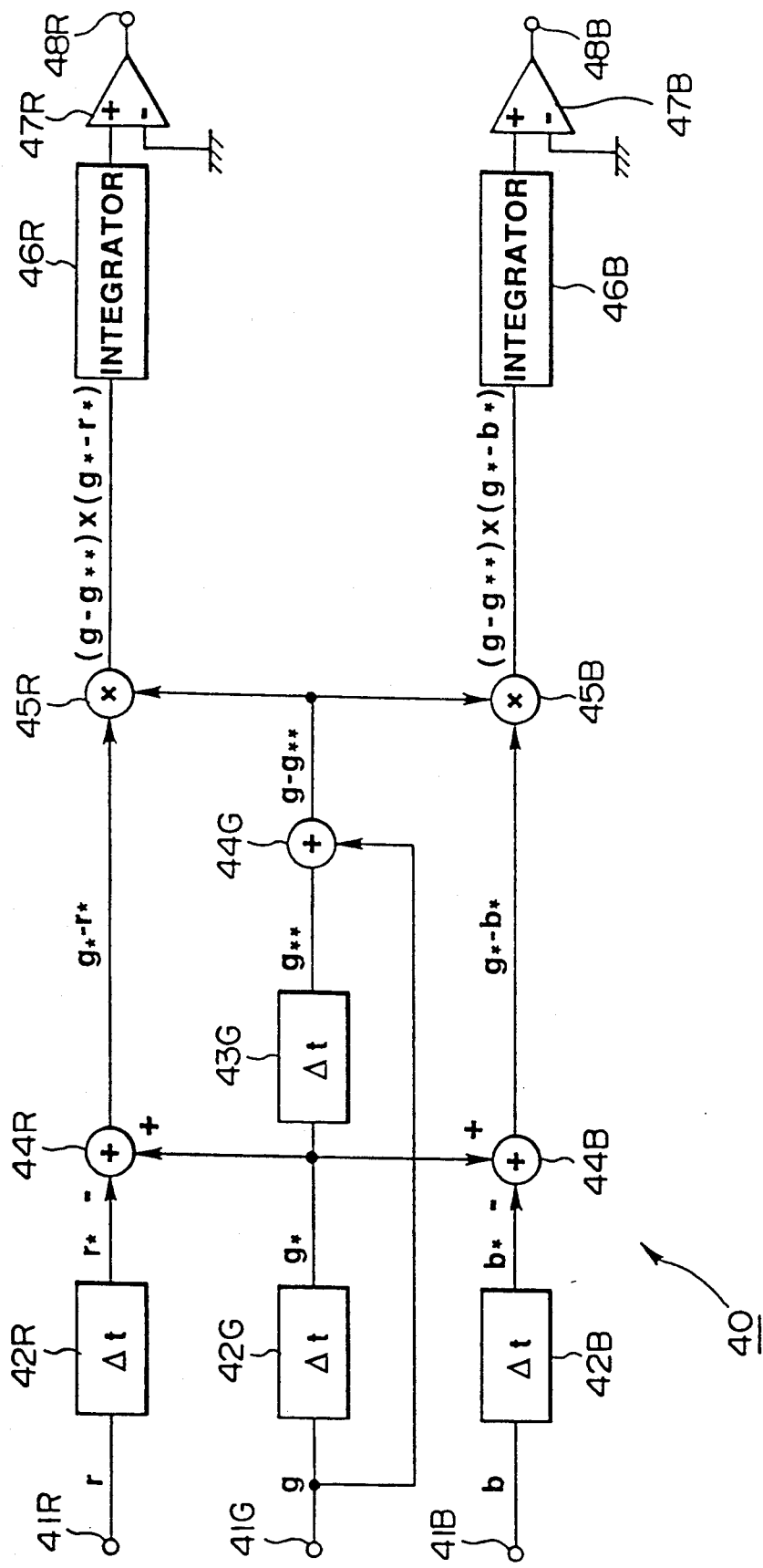

FIG. 2 is a block diagram showing the phase difference detector 40.

The image pick-up outputs of three primary colors from the shift registers 23R, 23G and 23B are delivered to the input terminals 41R, 41G and 41B of the phase difference detector 40 shown in FIG. 2, respectively.

Figure 3:
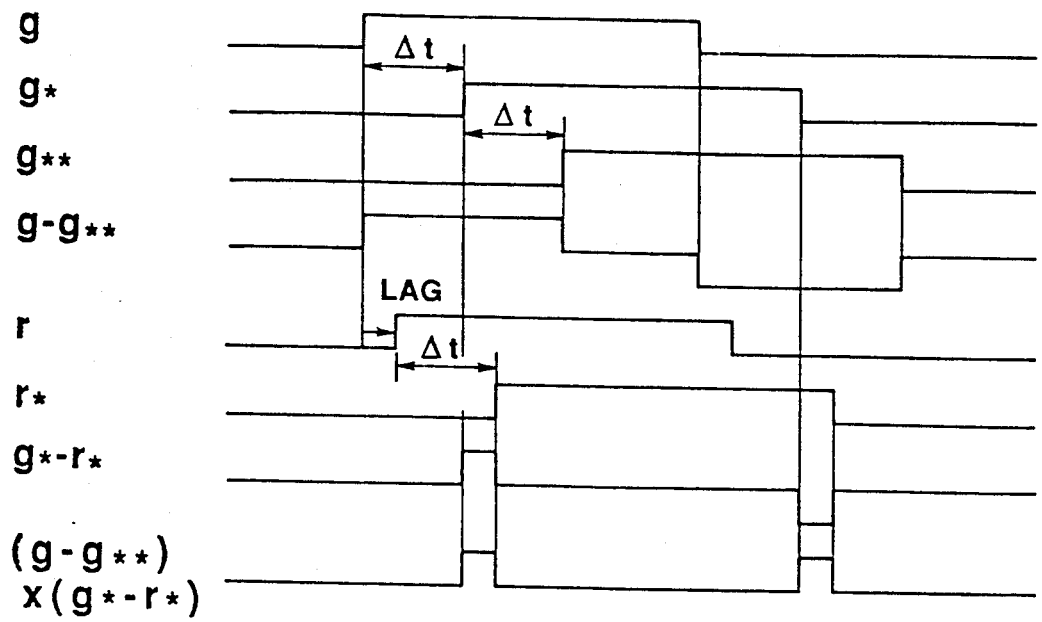

Initially, the operation of the phase difference detector 40 will be described with reference to the time chart of FIG. 3 in connection with the case where the phase of a red image pick-up output r delivered to the input terminal 41 R is lagging with respect to a green image pick-up output g delivered to the input terminal 41G.

These image pick-up outputs r and g delivered to the input terminals 41R and 41G are delayed by a predetermined delay time $\Delta t$ at delay circuit 42R and 42G, resulting in image pick-up outputs r* and g*, respectively. The image pick-up output g* outputted from the delay circuit 42G of the above-mentioned output is further delayed by the predetermined delay time Δt at the delay circuit 43G, resulting in an image pick-up output g. This image pick-up output g is subtracted from the image pick-up output g at a computational circuit 44G, resulting in an image pick-up output g−g**. Further, the image pick-up output r* outputted from the delay circuit 42R is subtracted from the image pick-up output g* from the delay circuit 42G, resulting in an image pick-up output g*−r*. This image pick-up output g*−r* is multiplied by the image pick-up output g−g from the computation circuit 44G at a multiplier 45R, resulting in a positive pulse output (g−g)×(g*−r*). This pulse output (g−g**)×(g*−r*) is integrated at an integrator 46R in order to improve the precision, and is then compared with a zero level at a comparator 47R, resulting in a detection output of H (high) level indicating a lagging phase. This detection output is outputted from an output terminal 48R.

Figure 4:
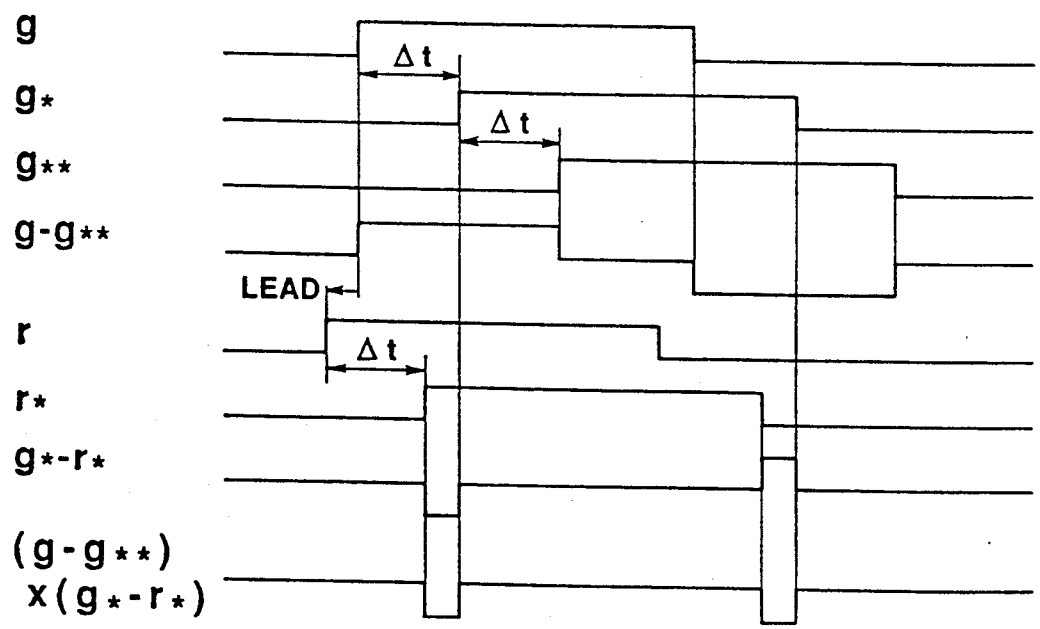

Explanation will now be given with reference to the time chart of FIG. 4 in correspondence with the above-described time chart of FIG. 3 in connection with the case where the phase of a red image pick-up output r delivered to the input terminal 41R is leading with respect to a green image pick-up output g delivered to the input terminal 41G in a manner opposite to the above. In this case, since a negative pulse output (g−g**)×(g*−r*) is provided from the multiplier 45R, a detection output of L (low level indicating a leading phase is outputted from the output terminal 48R.

Similarly, the phase relationship of a blue image pick-up output b delivered to the input terminal 41B with respect to a green image pick-up output g delivered to the input terminal 41G is detected by a delay circuit 42B, a computation circuit 44B, a multiplier 45B, an integrator 46B, and a comparator 47B. When the blue image pick-up output b indicates a lagging phase, a detection output of H level is outputted from the output terminal 48B, while when that output b indicates a leading phase, a detection of L level is outputted therefrom.

The phase difference detector 40 forms detection output of phase differences between these image pick-up outputs in dependency upon image pick-up outputs of three primary colors outputted from the respective shift registers 23R, 23G and 23B.

Now, a clock signal having a predetermined frequency is delivered commonly to the fourth to sixth sample-and-hold circuits 22R, 22G and 22B. These fourth to sixth sample-and-hold circuits 22R, 22G and 22B sample and hold, at the same timings, image pick-up outputs from the first to third sample-and-hold circuits 21R, 21G and 21B in accordance with a clock signal from the clock generator 27, respectively.

Further, the first to third sample-and-hold circuits 21R, 21G and 21B sample and hold image pick-up outputs of three primary colors delivered from the transmission unit 30 at a period of the clock signal, i.e., a period of the sampling period of the fourth to sixth sample-and hold circuits 22R, 22G and 22B, respectively. The sampling timings at this time are caused to be adjustable by the control circuit 26 which will be described later, respectively.

Furthermore, the shift registers 23R, 23G and 23B give delay times which are multiple of an integer of the period of the clock signal, i.e., the Sampling period of the fourth to sixth sample-and-hold circuits 22R, 22G and 22B to provide outputs thus delayed, respectively. The delay times of these shift registers 23R, 23G and 23B are also caused to be adjustable by a control by the control circuit 26 which will be described later.

Detection outputs of phase differences between respective image pick-up outputs from these shift registers 23R, 23G and 23B are delivered to from the phase difference detector 40 to the control circuit 26.

Figure 5:
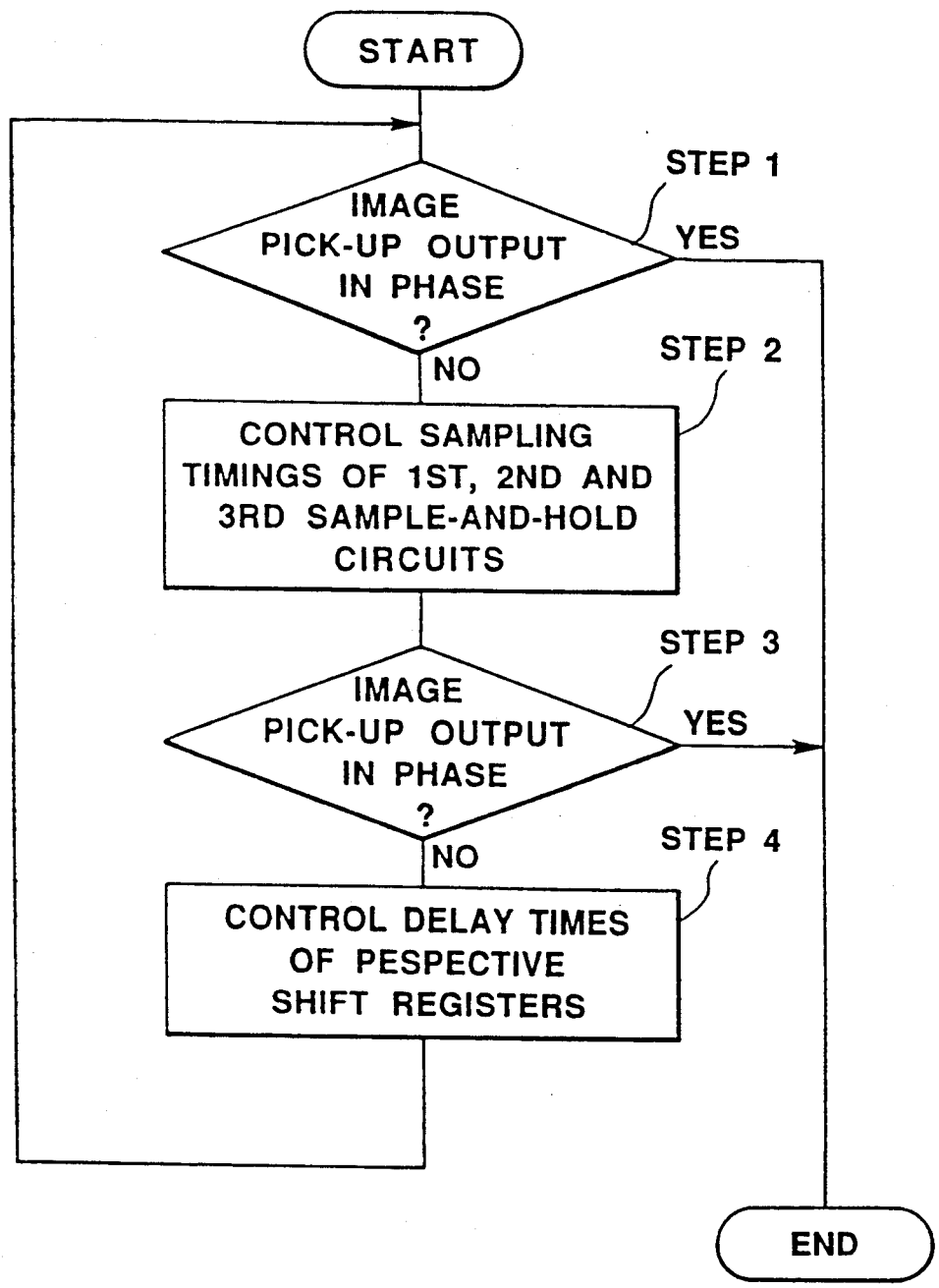

This control circuit 26 serves to conduct the following control operation in dependency upon detection outputs from the phase difference detector 40 in accordance with the procedure shown in the flowchart of FIG. 5, for example.

After the control operation is initiated, at step 1, judgment as to whether or not image pick-up outputs from the respective shift registers 23R, 23G and 23B are in phase with each other is made by the detection outputs from the phase difference detector 40. As a result, when the phase are in correspondence with each other (YES), the operation is completed. In contrast, when the phases are not in correspondence with each other (NO), the control operation proceeds to the step 2.

At the step 2, sampling timings of the first to third sample-and-hold circuits 21R, 21G and 21B are shifted within a range of one sampling period, thus to carry out a control to correct phase differences less than the sampling period.

Figure 6:
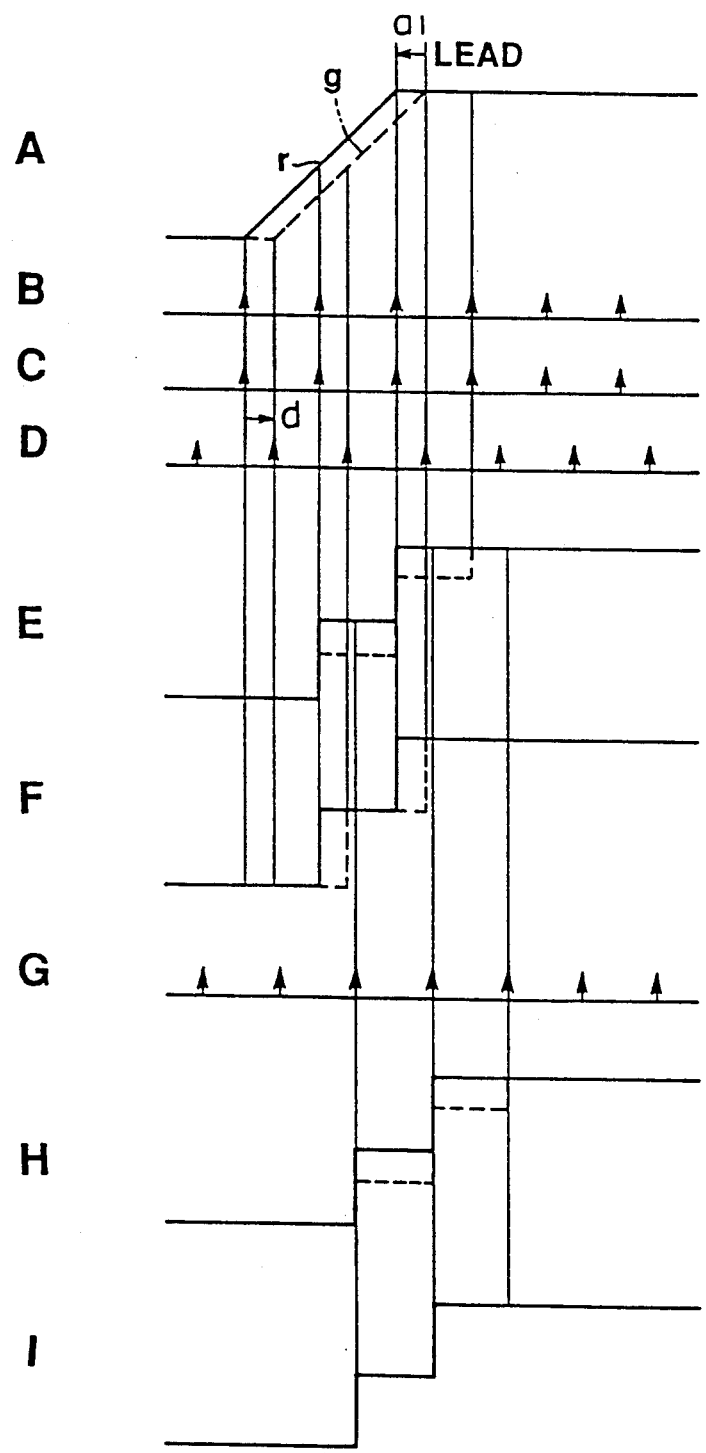

The control carried out at the step 2 will be described by taking an example of the case where a red image pick-up output r leading in phase by a period $a_1$ shorter than the sampling period, as shown in FIG. 6A, with respect to a green image pick-up output g delivered to the second sample-and-hold circuit 21G is delivered to the first sample-and-hold circuit 21R.

In this case, the second sample-and-hold circuit 21G samples and holds the above-mentioned green image pick-up output g, e.g., at the timing shown in FIG. 6B to form a sample-hold output indicated by the solid line in FIG. 6E. On the other hand, the first sample-and-hold circuit 21R samples and holds the above-mentioned red image pick-up output r, e.g., at a timing shown in FIG. 6C which is the same as the timing shown in FIG. 6B to form a sample-hold output indicated by broken lines in FIG. 6E.

The respective sample-hold outputs shown in FIG. 6E are subjected to sample-and-hold processing by the fourth and fifth sample-and-hold circuits 22R and 22G, e.g., at the timing shown in FIG. 6E, resulting in sample-hold outputs respectively indicated by the solid line and broken lines in FIG. 6H.

Since there occurs a level difference between sample-and-hold outputs shown in FIG. 6H in dependency upon a phase difference between respective image pick-up outputs r and g shown in FIG. 6A, if such sample-and-hold outputs are outputted through the respective shift registers 23R and 23G under the condition where the phase relationship is maintained, a level difference between these sample-and-hold outputs is detected as a phase difference at the phase difference detector 40. The output thus detected is delivered to the control circuit 26.

The control circuit 26 shifts in succession the sampling timing of the sample-and-hold circuit 21R to which the red image pick-up output r is delivered in a direction to decrease the phase difference in dependency upon the detection output from the phase difference detector 40. When the sampling shown in FIG. 6C becomes in correspondence with the timing shown in FIG. 6D, levels of respective sample-and-hold circuits 21R and 21G are in correspondence with each other as shown in FIG. 6F. For this reason, when these sample-hold outputs are subjected to sample-and-hold processing at a timing shown in FIG. 6G by the respective sample-and-hold circuits 22R and 22G, the sample-and-hold outputs become in phase with each other as shown in FIG. 6I. When the delay times of the respective shift registers 23R and 23G are equal to each other, respective sample-and-hold outputs which are in phase with each other are delivered to the image pick-up signal processing circuit 24 or the phase difference detector 40 under the state where they are in phase with each other.

At the step 3, whether or not the phases of image pick-up outputs outputted from the respective shift registers 23R, 23G and 23B are in correspondence with each other by the control at the step 2 as stated above is judged from detection outputs from the phase difference detector 40. As a result, when their phases are in correspondence with each other (YES), the operation is completed.

Figure 8:
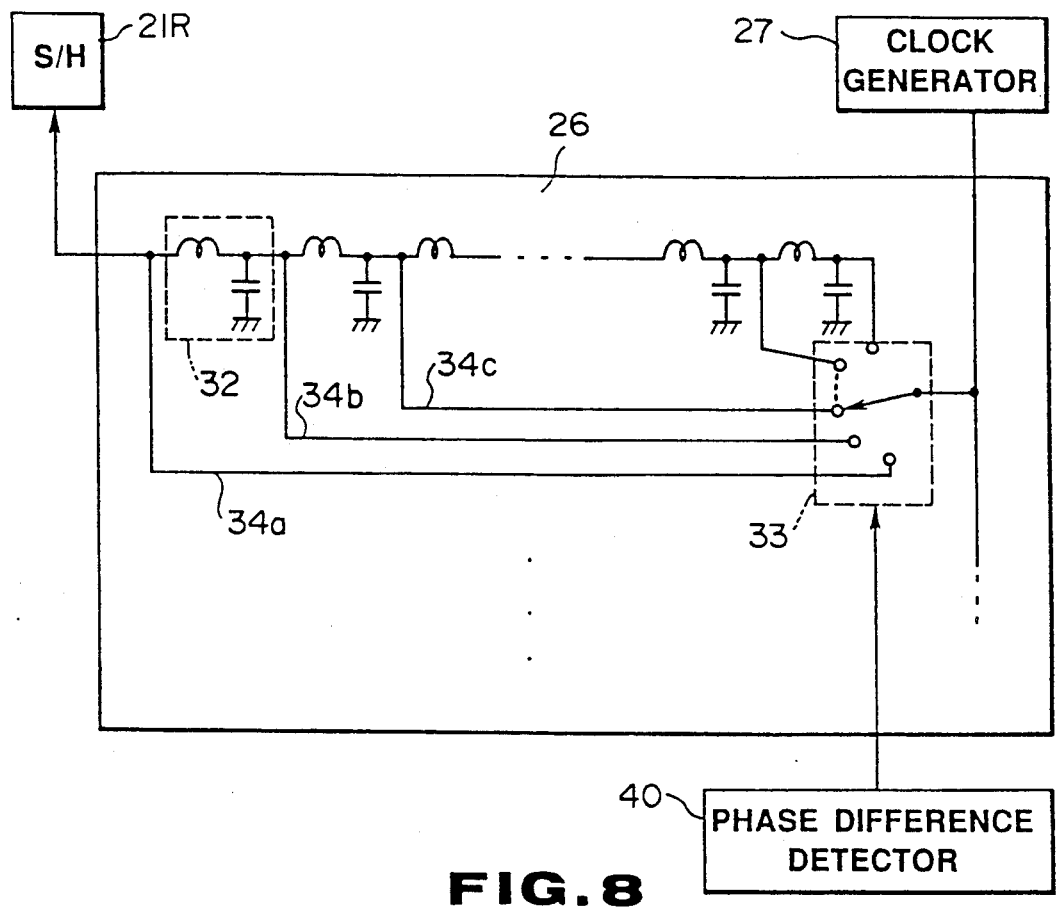

This operation will be described in detail with reference to FIG. 8. As shown in this figure, a plurality of delay circuit 32 each comprised of a coil and a capacitor and having a predetermined delay time are connected in series with the control circuit 26 between the clock generator 27 and the sample-and-hold circuit 21R. Lead lines are provided from the portions between delay circuits 32, respectively. A clock signal delivered from the clock generator 27 is delivered to the sample-and-hold circuit 21R by way of any lead line 34 through a changeover switch 33. Further, a clock signal is delivered to each of sample-and-hold circuits 21G and 21B in a manner stated above. In the initial a clock signal is delivered to the sample-and-hold circuit 21R through a lead line 34a which does not pass through any one of delay circuits.

In this case, since the red image pick-up output r leads the green image pick-up output g, a detection output of L level is delivered from the phase difference detector 40 to the control circuit 26. In the control circuit 26, when a detection output of L level is delivered thereto, the switch 33 is switched so as to deliver a clock signal delivered to the sample-and-hold circuit 21R for sampling the red image pick-up output r through the lead line 34a to the example-and-hold circuit 21R through the lead line 34b via one stage of delay circuit. By this operation, the phase of the red image pick-up output r which has lead the green image pick-up output g is lagged. Thus, a phase difference between the green image pick-up output g and the red image pick-up output r is reduced.

A phase difference between the green image pick-up output g and the red image pick-up output r is detected at the phase difference detector 40 for a second time. In the case where the red image pick-up output r leads the green image pick-up output g, a detection output of L level is delivered for the phase difference detector 40 to the control circuit 26 for a second time. Thus, the switch 33 is switched so as to deliver a clock signal which has been delivered to the sample-and-hold circuit 21R through the lead line 34b to the sample-and-hold circuit 21R through the lead line 34C. By repeatedly carrying out this operation, the green image pick-up output g and the red image pick-up output r become in phase with each other.

In actual, when the phase difference is reduced to a delay time of the delay circuit 32 or less, since the phase difference detector has only detection outputs of H level and L level, signals are outputted one after another from two signal lines 34 adjacent to a corresponding signal line, in which the phases are actually in correspondence with each other. However, it is sufficient that the delay time of the delay circuit 32 is set to a value smaller than values in the range of phase difference required for the apparatus.

Accordingly, in the case where phase differences between respective image pick-up outputs delivered to the first to third sample-and-hold circuits 21R, 21G and 21B are less than one sampling period, the sampling timings of the first to third sample-and-hold circuits 21R, 21G and 21B are controlled in this way to sample and hold image pick-up outputs at the timings at the fourth to sixth sample-and-hold circuits 22R, 22G and 22B, thereby permitting the phases of image pick-up outputs from the respective sample-and-hold circuits 22R, 22G and 22B to be in correspondence with each other.

Further, for example, as shown in FIG. 7A, in the case where the phase of a red image pick-up output r delivered to the first sample-and-hold circuit 21R is leading for a long period $a_2$ longer than the sampling period with respect to a green image pick-up output g delivered to the second sample-and-hold circuit 21G, even if the sampling timing of the first sample-and-hold circuit 21R is shifted by the control at the above-mentioned step 2 over one sampling period, phases of image pick-up outputs from the fourth and fifth sample-and-hold circuit 22R and 22G are not in correspondence with each other. Accordingly, the result of the judgment at the step 3 is NO, and the control operation proceeds to the next step 4.

At the step 4, the delay times of respective shift registers 23R, 23G and 23B are caused to be adjustable, thus to carry out a control to correct phase difference which are multiple of an integer of the sampling period of the respective sample-and-hold circuits 22R, 22G and 22B.

The control carried out at the step 4 will now be described by taking an example of the case shown in FIG. 7A.

Figure 7:
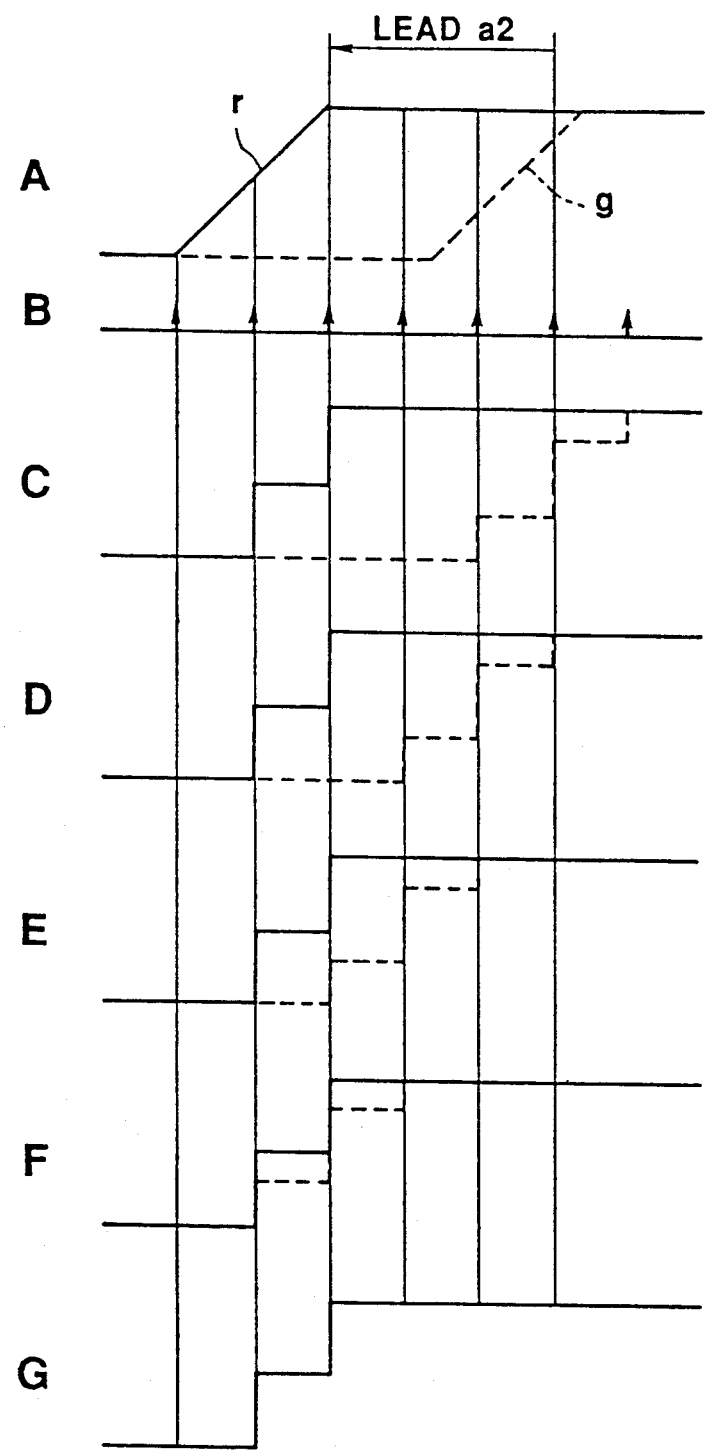

Respective image pick-up outputs r and g shown in FIG. 7 are subjected to sample-and-hold processing at the first and second sample-and-hold circuits 21R and 21G. Thereafter, these outputs are further subjected to sample-and-hold processing e.g., at a timing shown in FIG. 7B by the fourth and fifth sample-and-hold circuit 22R and 22G, resulting in a sample-hold output shown in FIG. 7C. When it is assumed that delay times of the respective shift registers 23R and 23G are equal to each other, these sample-hold outputs are outputted through the respective shift registers 23R and 23G under the state the phase relationship shown in FIG. 7C is maintained. Accordingly, their phase differences are detected at the phase difference detector 40. The detection result is delivered to the control circuit 26. At the step 4, the control circuit 26 carries out a control to prolong a delay time of the shift register 23R to which a red image pick-up output indicated by the solid line in FIG. 7C which indicates a lagging phase by a time equal to one sampling period of the respective sample-and-hold circuits 22R, 22G and 22B in dependency upon a detection result of the phase difference detector 40. For this reason, the phase of the red image pick-up output outputted from the shift register 23R is delayed by one sampling period as indicated by solid line in FIG. 7D. As a result, the phase difference between the red image pick-up output and the green image pick-up output indicated by broken lines is reduced by a time corresponding to the one sampling period.

The control operation returns to the above-mentioned step 1 for a second time to make a judgment as to whether or not phase of respective image pick-up outputs are in correspondence with each other. As a result, in the case where their phases are not in correspondence with each other as shown in FIG. 7D (NO), the above-mentioned control at the step 2 is carried out. However, since there still exist phase differences more than a sampling period between respective image pick-up outputs shown in FIG. 7D, the phases are not in correspondence with each other even by the control at the step 2. As a result, the result of the judgment at the step 3 is NO. Thus, the control operation proceeds to the step 4 for a second time. For this reason, at the step 4, the delay time of the shift register 23R for outputting red image pick-up output is further prolonged by a time equal to one sampling period to further delay a red image pick-up output having a leading phase by a time corresponding to one sampling period as shown by the solid line in FIG. 7E. Then, by repeatedly executing such steps 1 to 4 once more, phase differences between the respective image pick-up outputs fall within one sampling period as shown in FIG. 7F. For this reason, when the control operation proceeds to the step 2 via the step 1, the sampling timings of the respective sample-and-hold circuits 21R and 21G are controlled as described above, whereby phase of respective image pick-up outputs outputted from the respective shift registers 23R and 23G are in correspondence with each other as shown in FIG. 7G. As a result, when the result of the judgment at the step 3 is YES, the control operation is completed.

Figure 9:
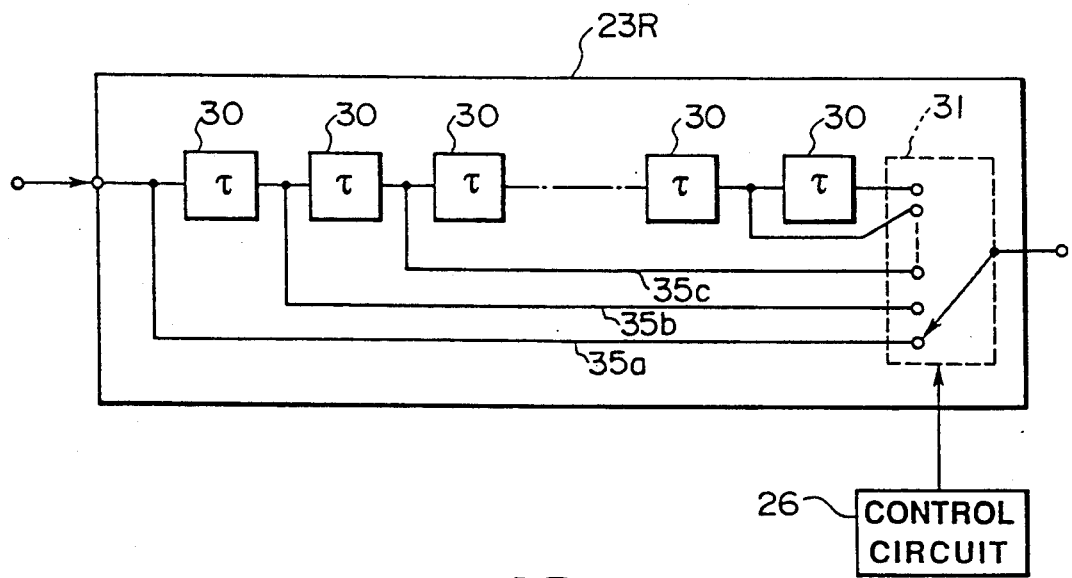

This operation will be described in detail with reference to FIG. 9. As shown in this figure, a plurality of taps 30 having a delay time equal to one sampling period are connected in series with the shift register 23R, and lead lines drawing out from the portions between taps 30 are provided. By switching the switch 33 on the basis of a detection output from a phase difference detector 40, a signal is outputted from any one of lead lines 35. In the initial state, a signal is outputted through the lead line 35a. In addition, shift registers 23G and 23B are of the same structure as that of the shift register 23R.

In this case, since the phase of the red image pick-up output r is leading with respect to the phase of the green image pick-up output g, a detection output at L level is delivered from the phase difference detector 40. In the control circuit 26, when the detection output of L level is delivered thereto, a control signal is delivered to the shift register 23R. Thus, in the shift register 23R, the switch 33 is switched so as to output a signal which has been outputted from the lead line 34a through the lead line 34b. As a result, since a signal is outputted through the number of taps 32 larger by one stage than that in the initial state, state, the phase of the red image pick-up output r is delayed by one sampling period. Thus, the phase difference between the green image pick-up output g and the red image pick-up output r is reduced.

Then, the phase difference between the green image pick-up output g and the red image pick-up output r is detected in the phase difference detector 40 for a second time. As a result when the phase of the red image pick-up output r is leading with respect to the phase of the green image pick-up output g, a detection output of L level is delivered from the phase difference detector 40 to the control circuit 26.

Thus, the control circuit 26 carries out the above-described operation at the step 2 for a second time. As a result, in the case where phases of the both image pick-up outputs are not still in correspondence with each other, the operation at the step 3 is carried out. This operation is continues until the phase difference between the both image pick-up outputs becomes equal to zero.

As stated above, even in the case where there exist phase differences greater than the sampling period between respective image pick-up outputs delivered to the sample-and-hold circuits 21R, 21G and 21B, an approach is employed to repeatedly execute the above-mentioned step 4 to thereby control delay times of the respective shift registers 23R, 23G and 23B so that they become equal to a multiple of an integer of the sampling period, thus permitting other image pick-up outputs except for an image pick-up output of which phase is most lagging to have a phase difference within one sampling period with respect to the most lagging image pick-up output. Further, an approach is employed to correct phase differences within the sampling period by the above-mentioned step 2, thereby making it possible to allow phases of respective image pick-up outputs delivered to the image pick-up processing circuit 24 to be completely in correspondence with each other.

Accordingly, it is advantageous that such a control operation is carried out when photographing is started, or the transmission unit 30 is exchanged. Namely, even if there occur phase differences between respective image pick-up outputs at the transmission unit 30m, it is possible to completely correct the phase differences prior to implementing the signal processing at the image pick-up signal processing circuit 24. Thus, an output video signal in which pictorial images of three primary colors precisely overlap with each other can be provided.

It is to be noted that in the case where digital signal processing is carried out at the image pick-up signal processing circuit 24, the above-mentioned fourth to sixth sample-and-hold circuits 22R, 22G and 22B may be constituted in principle with an analog/digital (A/D) converter for performing the sample-and-hold operation.

Further, in this embodiment, an arrangement is employed to correct phase differences less than the sampling period by the combination of the sampling by the first to third sample-and-hold circuits 21R, 21G and 21B and the sampling by the fourth to sixth sample-and-hold circuits 22R, 22G and 22B thereafter to correct phase differences which are multiple of an integer of the sampling period at the respective shift registers 23R, 23G and 23B. In addition to the above-mentioned arrangement, an arrangement may be employed to provide the respective shift registers 23R, 23G and 23B between the first to third sample-and-hold circuits 21R, 21G and 21B and the fourth to sixth sample-and-hold circuits 22R, 22G and 22B to correct the phase differences in a manner similar to that in the above-described embodiment.

As stated above, in accordance with the image pick-up apparatus according to this invention, an approach is employed to sample and hold image pick-up outputs of three primary colors delivered from the image pick-up unit to the signal processing unit through the transmission unit at the first to third sample-and-hold circuits of which sampling timings are respectively controlled by the control circuit on the basis of phase differences between image pick-up outputs thereafter to sample and hold such image pick-up outputs entirely at the same timings at the fourth to sixth sample-and-hold circuits to thereby correct phase differences less than the sampling period of these fourth to sixth sample-and-hold circuits. In addition, an approach is employed to control delay times of the three delay circuits to which outputs from the first to third sample-and-hold circuits are delivered by the control output on the basis of phase differences between the respective image pick-up outputs to correct phase differences which are multiple of an integer of the sampling period.

For this reason, the image pick-up apparatus according to this invention can precisely correct, at the signal processing unit, phase differences produced between respective image pick-up outputs resulting from the difference between length or characteristics of the transmission paths to form an output video signal in which three primary color images of red (R), green (G) and blue (B) precisely overlap with each other.

Accordingly, as in the above-described embodiment, for example, even in the case of a separate type image pick-up apparatus of a structure to transmit image pick-up outputs of three primary colors from the solid state image pick-up devices of the image pick-up unit through the transmission paths, respectively, centering can be adjusted with ease on the signal processing side.

In addition, when this invention is applied to an image pick-up apparatus for a high definition television, an output video signal free from a color shift and of high resolution and picture quality cannot be provided.

What is claimed is:

1. An image pick-up apparatus having photoelectric converter for producing three base band color signals from incoming light signal, three transmitting channels connected to said photoelectric converter for transmitting each of said three base band color signal respectively, and signal process means for producing a video signal from said three base band color signals transmitted by said three transmitting channels, wherein said processing means comprising:

a. a clock signal generating means for generating a clock signal having a predetermined frequency,
   b. first, second and third sample-and-hold circuits for sampling each of said three base band color signals respectively transmitted by said three transmitting channels,
   c. fourth, fifth and sixth sample-and-hold circuits supplied with each output of said first, second and third sample-and-hold circuits for sampling the same in response to said clock signal,
   d. first, second and third delay circuits supplied with each output of said fourth, fifth and sixth sample-and-hold circuits respectively for delaying the same.
   e. phase difference detector supplied with the outputs of said first, second and third delay circuits for detecting phase differences among the outputs of said first, second and third delay circuits, and
   f. phase control means for controlling sampling timing of said first, second and third sample-and-hold circuits to adjust said phases differences to that phase differences less than one sampling period can be adjusted thereby, and for controlling the delay time of said first, second and third delay circuits to adjust said phase differences so that phase differences being N (N is an integer) times said sampling period can be adjusted thereby.

2. The image pick-up apparatus according to claim 1, in which said phase difference detector comprises first and second pulse generators for generating first and second pulse in response for generating first and second pulses response to the phase difference between two of three of said base band color signals and first and second comparators for comparing an amplitude level of said first and second pulse with a predetermined value of voltage and for producing a signal representing the phase relationship between said two of three base band signals provided by said first, second and third delay circuit.

* * * * *